(12) United States Patent
Maeda et al.

(10) Patent No.: US 6,941,763 B2
(45) Date of Patent: Sep. 13, 2005

(54) HEAT PUMP AND DEHUMIDIFYING APPARATUS

(75) Inventors: Kensaku Maeda, Kanagawa (JP); Hideo Inaba, Okayama (JP); Shunro Nishiwaki, Kanagawa (JP)

(73) Assignee: Ebara Corporation, Tokyo (JP)

( * ) Notice: Subject to any disclaimer, the term of this patent is extended or adjusted under 35 U.S.C. 154(b) by 37 days.

(21) Appl. No.: 10/704,683

(22) Filed: Nov. 12, 2003

(65) Prior Publication Data

US 2004/0194478 A1 Oct. 7, 2004

Related U.S. Application Data

(63) Continuation of application No. 10/069,119, filed as application No. PCT/JP00/08131 on Nov. 17, 2000, now Pat. No. 6,672,082.

(30) Foreign Application Priority Data

Nov. 19, 1999 (JP) .......................................... 11-330431

(51) Int. Cl.[7] .............................................. F25D 17/06
(52) U.S. Cl. ............................................... 62/93; 62/79
(58) Field of Search .............................. 62/79, 93, 402, 62/489, 513, 526

(56) References Cited

U.S. PATENT DOCUMENTS

| | | | |
|---|---|---|---|
| 4,235,080 A | 11/1980 | Cassidy | |
| 4,445,639 A | 5/1984 | Kinsell et al. | |
| 4,665,712 A | 5/1987 | Gehring et al. | |
| 4,809,521 A | * 3/1989 | Mokadam | 62/498 |
| 4,963,174 A | 10/1990 | Payne | |
| 4,966,005 A | 10/1990 | Cowell et al. | |
| 5,031,411 A | 7/1991 | Gehring et al. | |
| 5,305,822 A | 4/1994 | Kogetsu et al. | |
| 5,400,607 A | 3/1995 | Cayce | |
| 5,622,057 A | 4/1997 | Bussjager et al. | |
| 5,689,962 A | 11/1997 | Rafalovich | |

(Continued)

FOREIGN PATENT DOCUMENTS

| | | |
|---|---|---|
| EP | 0 846 923 A2 | 6/1998 |
| JP | 3-95331 | 4/1991 |
| JP | 2761379 | 3/1998 |
| JP | 10-288421 | 10/1998 |
| JP | 10-288486 | 10/1998 |
| JP | 3049445 | 3/2000 |
| WO | WO 94/00725 | 1/1994 |

OTHER PUBLICATIONS

Supplementary European Search Report dated Mar. 24, 2003.

*Primary Examiner*—Melvin Jones
(74) *Attorney, Agent, or Firm*—Westerman, Hattori, Daniels & Adrian, LLP

(57) ABSTRACT

This heat pump and dehumidifying apparatus have small energy-consumed per moisture-removed ratios. Their components include a pressurizer for raising refrigerant pressure; a condenser for condensing refrigerant, thereby heating a high-temperature heat source fluid; an evaporator for evaporating refrigerant to cool a low-temperature heat source fluid; and a heat exchanger in a refrigerant path connecting the condenser and the evaporator for evaporating and condensing refrigerant under an intermediate pressure between the condensor pressure and the evaporator pressure. The low-temperature heat source fluid is successively cooled by the heat exchanger, cooled by the evaporator, and heated by the heat exchanger. This fluid can be precooled by the heat exchanger before cooling in the evaporator, and heat removed during precooling can be returned to the fluid after cooling by the evaporator.

14 Claims, 13 Drawing Sheets

U.S. PATENT DOCUMENTS

| | | |
|---|---|---|
| 5,826,443 A | 10/1998 | Ares et al. |
| 5,918,472 A | 7/1999 | Jonqueres |
| 6,199,389 B1 | 3/2001 | Maeda |
| 6,212,892 B1 | 4/2001 | Rafalovich |
| 6,247,323 B1 | 6/2001 | Maeda |
| 6,272,871 B1 | 8/2001 | Eisenhour |
| 6,385,985 B1 | 5/2002 | Bussjager et al. |
| 6,442,951 B1 | 9/2002 | Maeda et al. |

\* cited by examiner 320   310
viewed in a direction
represented by an arrow A

US 6,941,763 B2

HEAT PUMP AND DEHUMIDIFYING APPARATUS

This application is a continuation of Ser. No. 10/069,119 filed Feb. 28, 2002 now U.S. Pat. No. 6,672,082, which is a 371 of PCT/JP00/08131 filed Nov. 17, 2000.

TECHNICAL FIELD

The present invention relates to a heat pump and a dehumidifying apparatus, and more particularly to a heat pump with a high COP and a dehumidifying apparatus which has such a heat pump and a high moisture removal per energy consumption.

BACKGROUND ART

As shown in FIG. 11, there has heretofore been available a dehumidifying apparatus having a compressor 1 for compressing a refrigerant, a condenser 2 for condensing the compressed refrigerant with outside air, an evaporator 3 for depressurizing the condensed refrigerant with an expansion valve 5 and evaporating the refrigerant to cool process air from an air-conditioned space 10 to a temperature equal to or lower than its dew point, and a reheater 4 for reheating the process air, which has been cooled to a temperature equal to or lower than its dew point, at the downstream side of the condenser 2 with the refrigerant upstream of the expansion valve 5. The refrigerant is condensed in the condenser and the reheater. With the illustrated dehumidifying apparatus, a heat pump HP is constituted by the compressor 1, the condenser 2, the reheater 4, the expansion valve 5, and the evaporator 3. The heat pump HP pumps heat from the process air which flows through the evaporator 3 into the outside air which flows through the condenser 2.

Here, operation of the heat pump HP shown in FIG. 11 will be described below with reference to a Mollier diagram shown in FIG. 12. The diagram shown in FIG. 12 is a Mollier diagram in the case where HFC134a is used as the refrigerant. A point a represents a state of the refrigerant evaporated by the evaporator 3, and the refrigerant is in the form of a saturated vapor. The refrigerant has a pressure of 0.34 Mpa, a temperature of 5° C., and an enthalpy of 400.9 kJ/kg. A point b represents a state of the vapor drawn and compressed by the compressor 1, i.e., a state at the outlet port of the compressor 1. In the point b, the refrigerant is in the form of a superheated vapor. The refrigerant vapor is cooled in the condenser 2 and reaches a state represented by a point c in the Mollier diagram. In the point c, the refrigerant is in the form of a saturated vapor and has a pressure of 0.94 MPa and a temperature of 38° C. Under this pressure, the refrigerant is cooled and condensed to reach a state represented by a point d. In the point d, the refrigerant is in the form of a saturated liquid and has the same pressure and temperature as those in the point c. The saturated liquid has an enthalpy of 250.5 kJ/kg. The refrigerant liquid is depressurized by an expansion valve 5 to a saturation pressure of 0.34 MPa at a temperature of 5° C. A mixture of the refrigerant liquid and the vapor at a temperature of 5° C. is delivered to the evaporator 3, in which the mixture removes heat from process air and is evaporated to reach a state of the saturated vapor, which is represented by the point a in the Mollier diagram. The saturated vapor is drawn into the compressor 1 again, and the above cycle is repeated.

Operation of the dehumidifying apparatus shown in FIG. 11 will be described below with reference to a psychrometric chart shown in FIG. 13. In FIG. 13, the alphabetical letters K, L, M correspond to the encircled letters in FIG. 11. Air (in a state K) from the air-conditioned space 10 is cooled to a temperature equal to or lower than its dew point to lower the dry bulb temperature thereof and lower the absolute humidity thereof, and reaches a state L. The state L is on a saturation curve in the psychrometric chart. The air in the state L is reheated by the reheater 4 to increase the dry bulb temperature thereof and keep the absolute humidity thereof constant, and reaches a state M. Then, the air is supplied to the air-conditioned space 10. The state M is lower in both of absolute humidity and dry bulb temperature than the state K.

With the conventional heat pump and dehumidifying apparatus described above, since it is necessary to considerably cool the air to its dew point, about half of the refrigerating effect of the evaporator in the heat pump is consumed to remove a sensible heat load from the air, so that the moisture removal (the dehumidifying performance) per electric power consumption is low. If a single-stage compressor is used as the compressor in the heat pump, then it produces a one-stage compression-type refrigerating cycle, resulting in a low coefficient of performance (COP) and a large amount of electric power consumed per amount of moisture removal.

It is therefore an object of the present invention to provide a heat pump with a high coefficient of performance (COP) and a dehumidifying apparatus which consumes a small amount of energy per amount of moisture removal.

DISCLOSURE OF INVENTION

According to an aspect of the present invention, as shown in FIG. 1, for example, there is provided a heat pump comprising: a pressurizer 260 for raising a pressure of a refrigerant; a condenser 220 for condensing the refrigerant to heat a high-temperature heat source fluid; an evaporator 210 for evaporating the refrigerant to cool a low-temperature heat source fluid; and heat exchanging means 300 disposed in a refrigerant path connecting the condenser 220 and the evaporator 210, for evaporating and condensing the refrigerant under an intermediate pressure between the condensing pressure of the condenser 220 and the evaporating pressure of the evaporator 210 to cool the low-temperature heat source fluid by evaporation of the refrigerant under the intermediate pressure and to heat the low-temperature heat source fluid by condensation of the refrigerant under the intermediate pressure; wherein the low-temperature heat source fluid is successively cooled by the heat exchanging means 300, cooled by the evaporator 210, and heated by the heat exchanging means 300 in the order named.

Preferably, the heat exchanging means 300 is arranged such that the refrigerant is repeatedly evaporated and condensed alternately under the intermediate pressure.

Typically, the refrigerant condensed by the condenser 220 to heat the high-temperature heat source fluid is the refrigerant pressurized by the pressurizer 260, and the refrigerant evaporated by the evaporator 210 to cool the low-temperature heat source fluid is pressurized by the pressurizer 260.

With the above arrangement, the heat pump comprises the heat exchanging means for evaporating and condensing the refrigerant under an intermediate pressure between the condensing pressure of the condenser and the evaporating pressure of the evaporator to cool the low-temperature heat source fluid by evaporation of the refrigerant under the intermediate pressure and to heat the low-temperature heat source fluid by condensation of the refrigerant under the intermediate pressure. Therefore, the low-temperature heat source fluid is successively cooled by the heat exchanging means, cooled by the evaporator, and heated by the heat exchanging means in the order named. Hence, the low-temperature heat source fluid can be precooled by the heat exchanging means prior to cooling in the evaporator, and the low-temperature heat source fluid which flows out of the evaporator can be heated with use of the heat in precooling.

According to another aspect of the present invention, there is provided a heat pump, wherein the intermediate pressure includes at least a first intermediate pressure and a second intermediate pressure lower than the first intermediate pressure, and the heat exchanging means 300 cools the low-temperature heat source fluid successively by evaporation of the refrigerant under the first intermediate pressure and by evaporation of the refrigerant under the second intermediate pressure in the order named, and the heat exchanging means heats the low-temperature heat source fluid successively by condensation of the refrigerant under the second intermediate pressure and by condensation of the refrigerant under the first intermediate pressure in the order named.

With the above arrangement, since a heat exchange is performed between the counterflows of the low-temperature heat source fluid, the heat exchanging means can achieve a very high efficiency of heat exchange.

According to still another aspect of the present invention, as shown in FIG. 1, for example, there is provided a dehumidifying apparatus comprising: a pressurizer 260 for raising a pressure of a refrigerant; a condenser 220 for condensing the refrigerant to heat a high-temperature heat source fluid OA; an evaporator 210 for evaporating the refrigerant to cool process air to a temperature equal to or lower than its dew point; heat exchanging means 300 disposed in refrigerant paths 107–111 connecting the condenser 220 and the evaporator 210, for evaporating and condensing the refrigerant under an intermediate pressure between the condensing pressure of the condenser 220 and the evaporating pressure of the evaporator 210 to cool the process air by evaporation of the refrigerant under the intermediate pressure and to heat the process air by condensation of the refrigerant under the intermediate pressure; and a process air path connecting the heat exchanging means 300 and the evaporator 210 such that the process air is successively cooled by the heat exchanging means 300, cooled by the evaporator 210, and heated by the heat exchanging means 300 in the order named.

Typically, the refrigerant condensed by the condenser 220 to heat the high-temperature heat source fluid is the refrigerant pressurized by the pressurizer 260, and the refrigerant evaporated by the evaporator 210 to cool the low-temperature heat source fluid is pressurized by the pressurizer 260.

Typically, the high-temperature heat source is ambient air, and the low-temperature heat source fluid is precooled in the heat exchanging means 300 prior to cooling in the evaporator 210. The low-temperature heat source fluid may be condensed by the heat exchanging means 300 while being precooled. Preferably, the heat exchanging means 300 is arranged such that the refrigerant is repeatedly evaporated and condensed alternately under the intermediate pressure. The heat exchanging means 300 may further be arranged such that the intermediate pressure includes at least a first intermediate pressure and a second intermediate pressure lower than the first intermediate pressure, and the heat exchanging means 300 cools the low-temperature heat source fluid successively by evaporation of the refrigerant under the first intermediate pressure and by evaporation of the refrigerant under the second intermediate pressure in the order named, and the heat exchanging means 300 heats the low-temperature heat source fluid successively by the condensation of the refrigerant under the second intermediate pressure and by condensation of the refrigerant under the first intermediate pressure in the order named. The dehumidifying apparatus may comprise a bypass path for delivering the refrigerant condensed by the condenser 220 to the evaporator 210 in bypassing relation to the heat exchanging means 300, as shown in FIG. 8, for example.

According to still another aspect of the present invention, as shown in FIG. 1, for example, there is provided a dehumidifying apparatus comprising: a pressurizer 260 for raising a pressure of a refrigerant; a condenser 220 for condensing the refrigerant; an evaporator 210 for evaporating the refrigerant to cool process air to a temperature equal to or lower than its dew point; and heat exchanging means 300 for precooling the process air at the upstream side of the evaporator 210 which cools the process air and reheating the process air at the downstream side of the evaporator 210 which cools the process air; wherein the refrigerant before being introduced into the evaporator 210 is supplied to the heat exchanging means 300.

Typically, the refrigerant condensed by the condenser 220 to heat the high-temperature heat source fluid is the refrigerant pressurized by the pressurizer 260, and the refrigerant evaporated by the evaporator 210 to cool the low-temperature heat source fluid is pressurized by the pressurizer 260.

According to still another aspect of the present invention, as shown in FIG. 8, for example, the dehumidifying apparatus may further comprise a bypass path 401 for delivering the refrigerant condensed by the condenser 220 to the evaporator 210, and the bypass path may bypass the heat exchanging means 300.

With the above arrangement, since the dehumidifying apparatus comprises the bypass path, in the case where the moisture contained in the low-temperature heat source fluid is to be removed by cooling the low-temperature heat source fluid with the evaporator, the relationship between the temperature and humidity of the low-temperature heat source fluid can appropriately be adjusted.

There may also be provided a dehumidifying apparatus having the heat pump, the low-temperature heat source fluid being process air, the evaporator 210 being arranged so as to cool the process air to a temperature equal to or lower than its dew point, and an air path connecting the heat exchanging means 300 and the evaporator 210 such that the process air is successively cooled by the heat exchanging means 300, cooled by the evaporator 210, and heated by the heat exchanging means 300 in the order named.

The present application is based on Japanese patent application No. 11-330431 filed on Nov. 19, 1999, which is incorporated herein as part of the disclosure of the present application.

The present invention can more fully be understood based on the following detailed description. Further applications of the present invention will become more apparent from the following detailed description. However, the following detailed description and specific examples will be described as preferred embodiments only for the purpose of explaining the present invention. It is evident to a person skilled in the art that various changes and modifications can be made to the embodiments in the following detailed description within the spirit and scope of the present invention.

The applicant has no intention to dedicate any of the embodiments described below to the public, and any of the disclosed modifications and alternatives which may not be included in the scope of the claims constitutes part of the invention under the doctrine of equivalent.

BEST MODE FOR CARRYING OUT THE INVENTION

Figure 1:
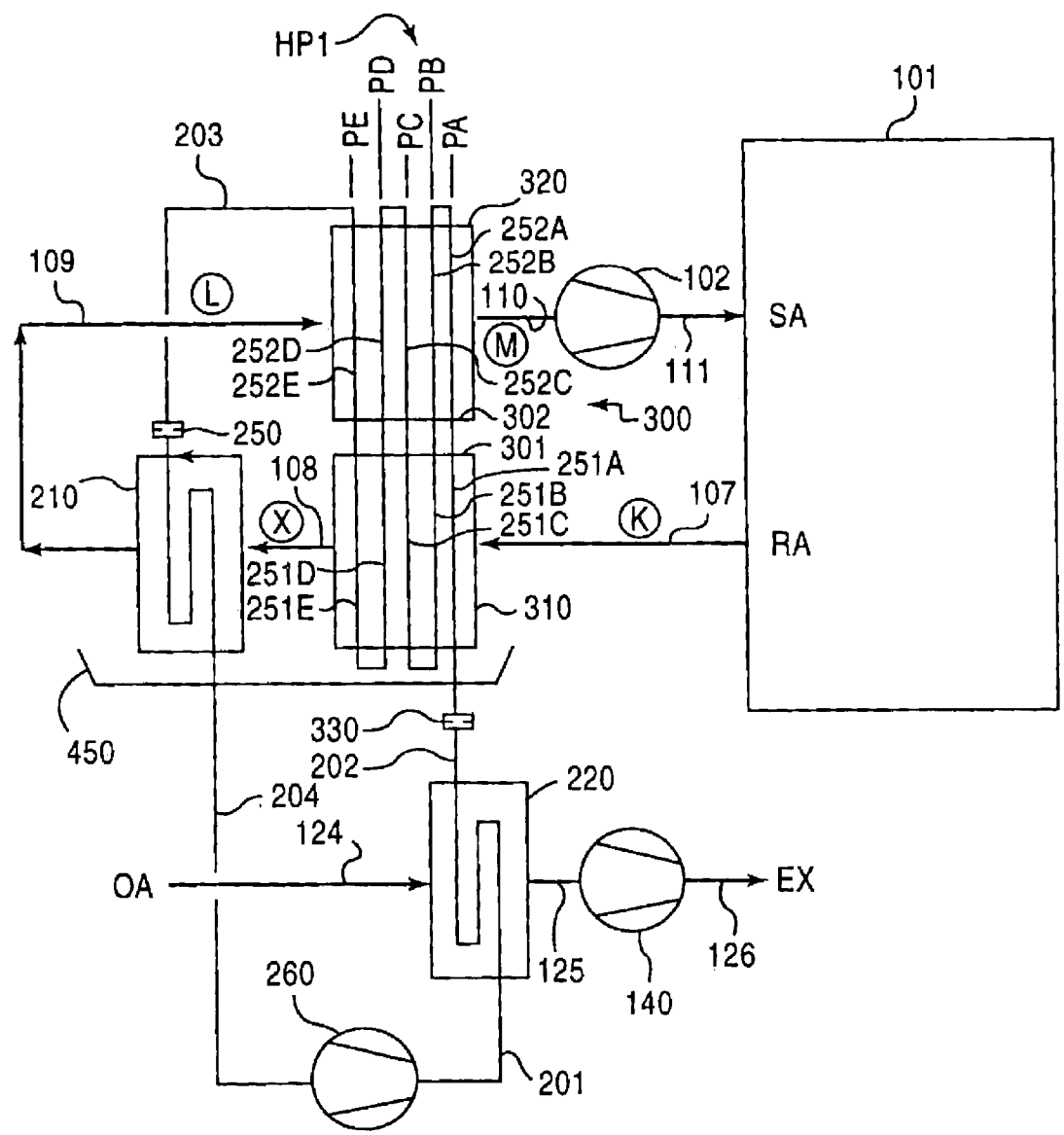
FIG. 1 is a flow diagram of a heat pump according to a first embodiment of the present invention and a dehumidifying air-conditioning apparatus having such a heat pump.

Embodiments of the present invention will be described below with reference to the accompanying drawings. Identical or corresponding parts are denoted by identical or like reference characters throughout drawings, and will not be described repetitively.

Figure 2:
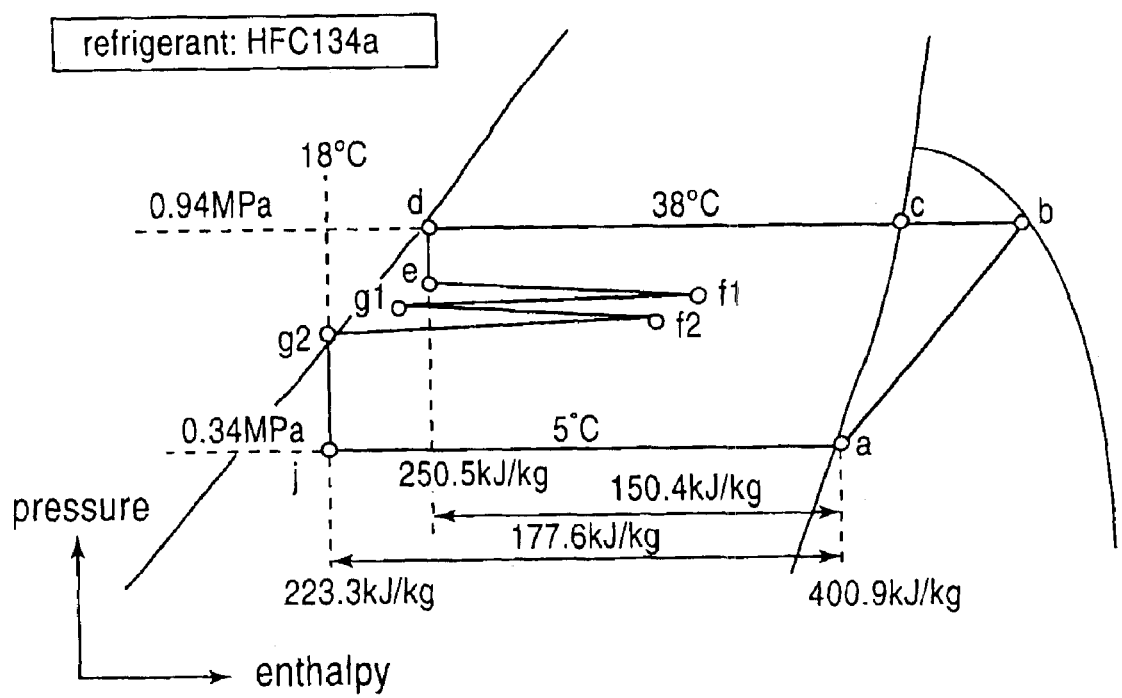
FIG. 2 is a Mollier diagram of the heat pump shown in FIG. 1.
Figure 3:
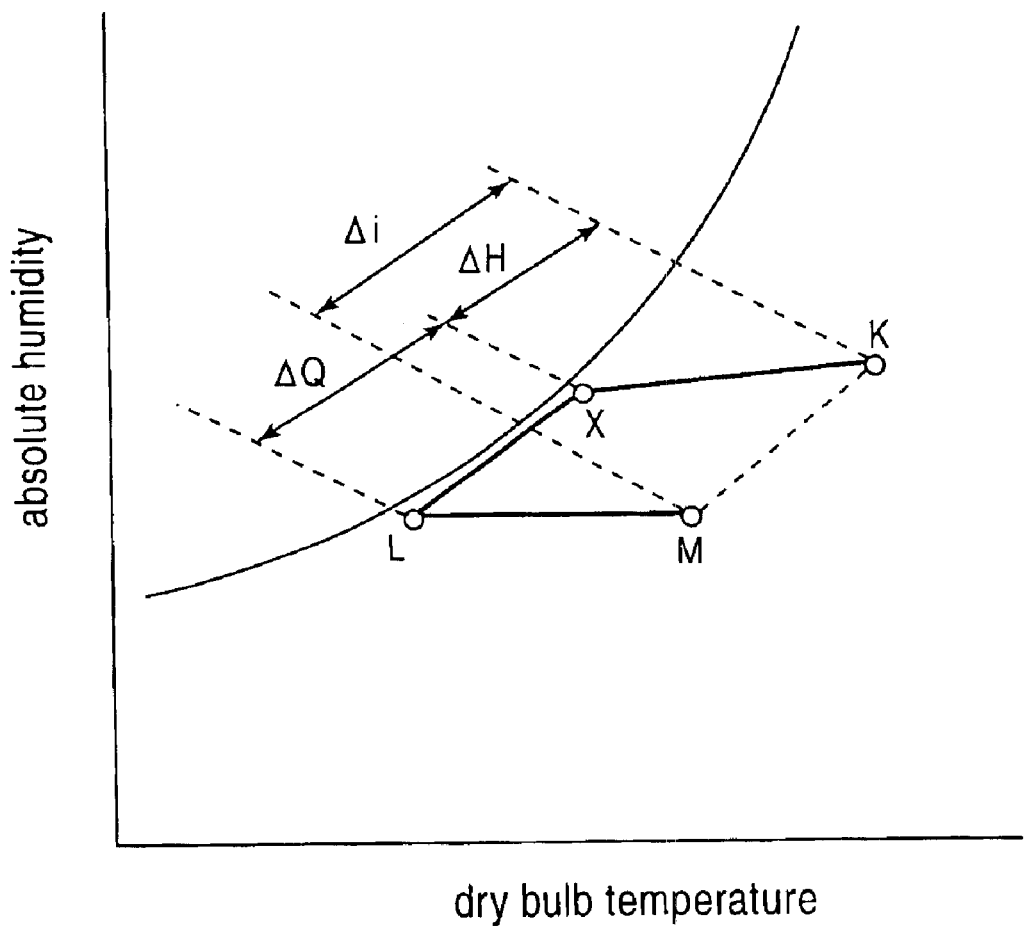
FIG. 3 is a psychrometric chart illustrative of operation of the dehumidifying air-conditioning apparatus shown in FIG. 1.

FIG. 1 is a flow diagram of a heat pump HP1 according to a first embodiment of the present invention and a dehumidifying air-conditioning apparatus having such a heat pump as a dehumidifying apparatus according to the present invention. The dehumidifying air-conditioning apparatus serves to cool process air to a temperature equal to or lower than its dew point for dehumidifying the air. FIG. 2 is a refrigerant Mollier diagram of the heat pump HP1 included in the air-conditioning apparatus shown in FIG. 1, and FIG. 3 is a psychrometric chart of the air-conditioning apparatus shown in FIG. 1.

Structural details of the heat pump according to the first embodiment and the dehumidifying air-conditioning apparatus having such a heat pump will be described below with reference to FIG. 1. The air-conditioning apparatus lowers the humidity of the process air with a cooler to maintain a comfortable environment in an air-conditioned space 101 supplied with the process air. In FIG. 1, devices related to the process air will be described along a path of the process air from the air-conditioned space 101. A path 107 connected to the air-conditioned space 101, a first compartment 310 in a heat exchanger 300, a path 108, an evaporator 210 for cooling the process air to a temperature equal to or lower than its dew point, a path 109, a second compartment 320 in the heat exchanger 300, a path 110, an air blower 102 connected to the path 110 for circulating the process air, and a path 111 are arranged in the order named so as to return the process air to the air-conditioned space 101.

Further, a path 124, a condenser 220 for cooling and condensing a refrigerant, a path 125, an air blower 140 for delivering cooling air, and a path 126 are arranged in the order named along a path of cooling air from outside air OA, so that the air is discharged as exhaust air EX.

Devices of the heat pump HP1 will be described below along a path of the refrigerant from the refrigerant evaporator 210. In FIG. 1, the refrigerant evaporator 210, a path 204, a compressor 260 for compressing the refrigerant which has been evaporated into a vapor by the refrigerant evaporator 210, a path 201, the refrigerant condenser 220, a path 202, a restriction 330, an evaporating section 251 for cooling process air which flows through the first compartment 310 in the heat exchanger 300, a condensing section 252 for heating (reheating) process air which flows through the second compartment 320 in the heat exchanger 300, a path 203 and a restriction 250 are arranged in the order named. The refrigerant passes alternately through the evaporating section 251 and the condensing section 252, and returns back to the refrigerant evaporator 210. The heat pump HP1 is thus constructed.

Structural details of the heat exchanger 300 will be described below. The heat exchanger 300 comprises a heat exchanger for performing a heat exchange between process air flowing into the evaporator 210 and process air flowing out of the evaporator 210, indirectly with the refrigerant. The heat exchanger 300 has a plurality of substantially parallel heat exchange tubes as refrigerant passages in each of a plurality of different planes PA, PB, PC, . . . which lie perpendicularly to the sheet of FIG. 1 and also to the flow of the process air. In FIG. 1, only one tube is shown in each of the above planes for simple illustration.

The heat exchanger 300 has the first compartment 310 for allowing the process air before flowing through the evaporator 210 to pass therethrough, and the second compartment 320 for allowing the process air after flowing through the evaporator 210 to pass therethrough. The first compartment 310 and the second compartment 320 form respective separate spaces, each in the form of a rectangular parallelepiped. Both of the compartments have partition walls 301, 302 disposed adjacent to each other, respectively, and the heat exchange tubes extend through these two partition walls.

In another embodiment, the heat exchanger 300 may be constructed such that a single space in the form of a rectangular parallelepiped is divided by a single partition wall 301 and the heat exchange tubes extend through the partition wall 301 and alternatively through the first compartment 310 and the second compartment 320.

In FIG. 1, the process air before being introduced into the evaporator 210 is supplied from the right side through the path 107 to the first compartment 310 and discharged from the left side of the first compartment 310 through the path 108. The process air which has passed through the evaporator 210 and has been cooled to a temperature equal to or lower than its dew point with the lowered absolute humidity is supplied from the left side through the path 109 to the second compartment 320 and discharged from the right side of the second compartment 320 through the path 110.

As shown in FIG. 1, the heat exchange tubes extend through the first compartment 310, the second compartment 320, and the partition walls 301, 302 which separate those compartments from each other. The heat exchange tubes disposed in the plane PA, for example, have portions extending through the first compartment 310, and such portions are referred to as an evaporating section 251A as a first refrigerant passage (hereinafter referred simply to as an evaporating section 251 in the case where it is not necessary to discuss a plurality of evaporating sections separately). The heat exchange tubes disposed in the plane PA also have portions extending through the second compartment 320, and such portions are referred to as a condensing section 252A as a second refrigerant passage (hereinafter referred simply to as a condensing section 252 in the case where it is not necessary to discuss a plurality of condensing sections separately). The evaporating section 251A and the condensing section 252A serve as a pair of first and second compartment extending portions, and constitute refrigerant passages.

Further, the heat exchange tubes disposed in the plane PB have portions extending through the first compartment 310, and such portions are referred to as an evaporating section 251B. The heat exchange tubes disposed in the plane PB also have portions extending through the second compartment 320, and such portions, which constitute a pair of refrigerant passages with the evaporating section 251B, are referred to as a condensing section 252B. Refrigerant passages are also provided in each of the planes PC, . . . as with the plane PB.

As shown in FIG. 1, the evaporating section 251A and the condensing section 252A are paired with each other and formed by a single tube as an integral passage. This feature, together with the fact that the first compartment 310 and the second compartment 320 are positioned adjacent to each other with the two partition walls 301, 302 being interposed therebetween, is effective in making the heat exchanger 300 small and compact as a whole.

In the heat exchanger shown according to the present embodiment, the evaporating sections 251A, 251B, 251C, . . . are successively arranged in the order named from the right in FIG. 1, and the condensing sections 252A, 252B, 252C, . . . are also successively arranged in the order named from the right in FIG. 1.

As shown in FIG. 1, the end of the condensing section 252A remote from the partition wall 302 and the end of the condensing section 252B remote from the partition wall 302 are connected to each other by a U tube. The end of the evaporating section 251B and the end of the evaporating section 251C are similarly connected to each other by a U tube.

Therefore, the refrigerant flowing in one direction from the evaporating section 251A to the evaporating section 252A is introduced into the condensing section 252B by the U tube, and then flows into the evaporating section 251B, from which the refrigerant flows into the evaporating section 251C via the U tube. In this manner, the refrigerant passages including the evaporating sections and the condensing sections extend alternately repetitively through the first compartment 310 and the second compartment 320. In other words, the refrigerant passages are provided as a group of meandering thin pipes. A group of meandering thin pipes pass through the first compartment 310 and the second compartment 320, and are held in alternate contact with the process air which has a higher temperature and the process air which has a lower temperature.

First, flows of the refrigerant between the devices will be described below with reference to FIG. 1, and then operation of the heat pump HP1 will be described below with reference to FIG. 2.

In FIG. 1, a refrigerant vapor pressurized by the refrigerant compressor 260 is introduced into the refrigerant condenser 220 via the refrigerant vapor pipe 201 connected to the discharge port of the compressor. The refrigerant vapor compressed by the compressor 260 is cooled and condensed by ambient air as cooling air.

The refrigerant condenser 220 has a refrigerant outlet connected by the refrigerant passage 202 to the inlet of the evaporating section 251A in the heat exchanger 300. The restriction 330 is disposed on the refrigerant passage 202 near the inlet of the evaporating section 251A.

The liquid refrigerant that flows out of the refrigerant condenser 220 is depressurized by the restriction 330 and expanded so as to be partly evaporated (flashed). The refrigerant which is a mixture of the liquid and the vapor reaches the evaporating section 251A, where the liquid refrigerant flows so as to wet the inner wall surface of the tube in the evaporating section 251A and is evaporated to cool (precool) the process air which flows through the first compartment 310 before flowing into the evaporator 210.

The evaporating section 251A and the condensing section 252A are constructed as a continuous tube. Specifically, since the evaporating section 251A and the condensing section 252A are provided as an integral passage, the evaporated refrigerant vapor (and the refrigerant liquid which has not been evaporated) flows into the condensing section 252A, and heats (reheats) the process air flowing through the second compartment 320, which has been cooled and dehumidified in the evaporator 210 and has a temperature lower than before flowing into the evaporator 210. In this time, heat is removed from the evaporated refrigerant vapor itself, and the evaporated refrigerant vapor is condensed.

As described above, the heat exchanger 300 has the evaporating section as the refrigerant passage extending through the first compartment 310 and the condensing section as the refrigerant passage extending through the second compartment 320 (at least one pair of them, e.g., denoted by 251A and 252A) in the first plane PA, and also has the condensing section as the refrigerant passage extending through the second compartment 320 and the evaporating section as the refrigerant passage extending through the first compartment 310 (at least one pair of them, e.g., denoted by 252B and 251B) in the second plane PB.

The outlet of the final condensing section in the heat exchanger 300 is connected to the evaporator 210 via the refrigerant liquid pipe 203, and the expansion valve 250 is disposed as a second restriction on the refrigerant pipe 203.

The refrigerant liquid condensed in the condensing section is depressurized and expanded by the restriction 250 to lower its temperature. Then, the refrigerant liquid enters the refrigerant evaporator 210 to be evaporated to cool the process air with heat of evaporation. The restrictions 330, 250 may comprise orifices, capillary tubes, expansion valves, or the like.

The refrigerant which has been evaporated into a vapor in the refrigerant evaporator 210 is introduced into the suction side of the refrigerant compressor 260 through the path 204, and thus the above cycle is repeated.

The behavior of the refrigerant in the evaporating sections and the condensing sections of the heat exchanger 300 shown in FIG. 1 will be described below. The refrigerant flows into the evaporating section 251A in the liquid phase. The refrigerant may be a refrigerant liquid which has been partly evaporated to slightly contain a vapor phase. While the refrigerant liquid is flowing through the evaporating section 251A, it precools the process air to be heated itself. The refrigerant enters the condensing section 252A while increasing the vapor phase thereof. In the condensing section 252A, the refrigerant heats the process air whose temperature has been made lower than the process air in the evaporating section 251A by being cooled and dehumidified. In this time, heat is removed from the refrigerant itself, and while the refrigerant in the vapor phase is being condensed, the refrigerant flows into the next condensing section 252B. While the refrigerant is flowing through the condensing section 252B, heat is further removed from the refrigerant by the process air having a lower temperature, and the refrigerant in the vapor phase is further condensed. Thereafter, the refrigerant flows into the next evaporating section 251B. In this manner, the refrigerant flows through the refrigerant passages while changing in phase between the vapor phase and the liquid phase. Thus, heat is exchanged between the process air before being cooled by the evaporator 210 and the process air which has been cooled by the evaporator 210 to lower its absolute humidity.

Next, operation of the heat pump HP1 will be described below with reference to FIG. 2. FIG. 2 is a Mollier diagram in the case where HFC134a is used as the refrigerant. In the Mollier diagram, the horizontal axis represents the enthalpy, and the vertical axis represents the pressure. In addition to the above refrigerant, HFC407C and HFC410A are suitable refrigerants for the heat pump and the dehumidifying apparatus according to the present invention. These refrigerants have an operating pressure region shifted toward a higher pressure side than HFC134a.

In FIG. 2, a point a represents a state of the refrigerant at the outlet port of the evaporator 210, and the refrigerant is in the form of a saturated vapor. The refrigerant has a pressure of 0.34 MPa, a temperature of 5° C., and an enthalpy of 400.9 kJ/kg. A point b represents a state of the vapor drawn and compressed by the compressor 260, i.e., a state at the outlet port of the compressor 260. In the point b, the refrigerant has a pressure of 0.94 MPa and is in the form of a superheated vapor.

The refrigerant vapor is cooled in the condenser 220 and reaches a state represented by a point c in the Mollier diagram. In the point c, the refrigerant is in the form of a saturated vapor and has a pressure of 0.94 MPa and a temperature of 38° C. Under this pressure, the refrigerant is cooled and condensed to reach a state represented by a point d. In the point d, the refrigerant is in the form of a saturated liquid and has the same pressure and temperature as those in the point c. The saturated liquid has an enthalpy of 250.5 kJ/kg.

The refrigerant liquid is depressurized by the restriction 330 and flows into the evaporating section 251A in the heat exchanger 300. This state is indicated at a point e on the Mollier diagram. The temperature of the refrigerant liquid is about 18° C. The pressure of the refrigerant liquid is an intermediate pressure according to the present invention, i.e., is of an intermediate value between 0.34 MPa and 0.94 MPa in the present embodiment. The refrigerant liquid is a mixture of the liquid and the vapor because a part of the liquid is evaporated.

In the evaporating section 251A, the refrigerant liquid is evaporated under the intermediate pressure, and reaches a state represented by a point f1, which is located intermediately between the saturated liquid curve and the saturated vapor curve, under the intermediate pressure. In the point f1, while a part of the liquid is evaporated, the refrigerant liquid remains in a considerable amount.

The refrigerant in the state represented by the point f1 flows into the condensing section 252A. In the condensing section 252A, heat is removed from the refrigerant by the process air which has a low temperature and flows through the second compartment 320, and the refrigerant reaches a state represented by a point g1.

The refrigerant in the state represented by the point g1 flows into the evaporating section 251B, where heat is removed from the refrigerant. The refrigerant increases its liquid phase and reaches a state represented by a point f2. Then, the refrigerant flows into the condensing section 252B, where the refrigerant increases its liquid phase and reaches a state represented by a point g2. Similarly, the refrigerant is repeatedly evaporated and condensed alternately in the evaporating sections and the condensing sections. On the Mollier diagram of FIG. 2, the evaporating and condensing sections in the plane PC and subsequent sections are omitted from illustration, on the assumption that the condensing section 252B is connected to the expansion valve 250.

On the Mollier diagram, the point g2 is on the saturated liquid curve. In this point, the refrigerant has a temperature of 18° C. and an enthalpy of 223.3 kJ/kg.

The refrigerant liquid at the point g2 is depressurized to 0.34 MPa, which is a saturated pressure at a temperature of 5° C., by the restriction 250, and reaches a state represented by a point j. The refrigerant at the point j flows as a mixture of the refrigerant liquid and the vapor at a temperature of 5° C. into the refrigerant evaporator 210, where the refrigerant removes heat from the process air to be evaporated into a saturated vapor at the state indicated by the point a on the Mollier diagram. The evaporated vapor is drawn again by the compressor 260, and thus the above cycle is repeated.

In the heat exchanger 300, as described above, the refrigerant goes through changes of the evaporated state from the point e to the point f1 or from the point g1 to the point f2 in the evaporating section 251, and goes through changes of the condensed state from the point f1 to the point g1 or from the point f2 to the point g2 in the condensing section 252. Since the refrigerant transfers heat by way of evaporation and condensation, the rate of heat transfer is very high and the efficiency of heat exchanger is high.

In the vapor compression type heat pump HP1 including the compressor 260, the refrigerant condenser 220, the restrictions 330, 250, and the refrigerant evaporator 210, when the heat exchanger 300 is not provided, the refrigerant at the state represented by the point d in the refrigerant condenser 220 is returned to the refrigerant evaporator 210 through the restrictions. Therefore, the enthalpy difference that can be used by the refrigerant evaporator 210 is only 400.9−250.5=150.4 kJ/kg. With the heat pump HP1 according to the present embodiment which has the heat exchanger 300, however, the enthalpy difference that can be used by the refrigerant evaporator 210 is 400.9−223.3=177.6 kJ/kg. Thus, the amount of vapor that is circulated to the compressor under the same cooling load and the required power can be reduced by 15%. Consequently, the heat pump HP1 according to the present embodiment can perform the same operation as with a subcooled cycle.

Operation of the dehumidifying air-conditioning apparatus having the heat pump HP1 will be described below with reference to a psychrometric chart shown in FIG. 3. FIG. 1 will be referred to for structural details. In FIG. 3, the alphabetical letters K, X, L and M represent states of air in various regions, and correspond to the alphabetical letters which are encircled in the flow diagram shown in FIG. 1. The psychrometric chart shown in FIG. 3 is also applicable to a dehumidifying air-conditioning apparatus according to another embodiment of the present invention which will be described later on.

In FIG. 3, the process air (in a state K) from the air-conditioned space 101 flows through the process air path 107 into the first compartment 310 in the heat exchanger 300, where the process air is cooled to a certain extent by the refrigerant that is evaporated in the evaporating section 251. This process can be referred to as precooling because the process air is preliminarily cooled before being cooled to a temperature equal to or lower than its dew point by the evaporator 210. While the process air is being precooled in the evaporating section 251, a certain amount of moisture is removed from the air to lower the absolute humidity of the air, and then air reaches a point X. The point X is on the saturation curve. Alternatively, the air may be precooled to an intermediate point between the point K and the point X. Further, the air may be precooled to a point that is shifted beyond the point X slightly toward a lower humidity on the saturation curve.

The precooled process air is introduced through the path 108 into the evaporator 210, where the air is cooled to a temperature equal to or lower than its dew point by the refrigerant which has been depressurized by the expansion valve 250 and is evaporated at a low temperature. Moisture is removed from the air to lower the absolute humidity and the dry bulb temperature of the air, and the air reaches a point L. Although the thick line representing a change from the point X to the point L is plotted as being remote from the saturation curve for illustrative purpose, it is actually aligned with the saturation curve.

The process air in a state represented by the point L flows through the path 109 into the second compartment 320 in the heat exchanger 300, where the process air is heated, with the constant absolute humidity, by the refrigerant condensed in the condensing section 252, and reaches a point M. The process air in the point M has a sufficiently lower absolute humidity than the process air in the point K, a dry bulb temperature which is not excessively lower than the process air in the point K, and a suitable relative humidity. The process air in the point M is then drawn by the air blower 102 and returned to the air-conditioned space 101.

In the heat exchanger 300, the process air is precooled by evaporation of the refrigerant in the evaporating section 251, and the process air is reheated by condensation of the refrigerant in the condensing section 252. The refrigerant evaporated in the evaporating section 251 is condensed in the condensing section 252. The same refrigerant is thus evaporated and condensed to perform a heat exchange indirectly between the process air before being cooled in the evaporator 210 and the process air after being cooled in the evaporator 210.

Ambient air is introduced through the path 124 into the condenser 220. The ambient air removes heat from the refrigerant which is condensed, and the heated ambient air is drawn through the path 125 into the air blower 140, from which the air is discharged through the path 126 as exhaust air EX.

In the air cycle on the psychrometric chart shown, in FIG. 3, the amount of heat which has precooled the process air in the first compartment 310, i.e., the amount H of heat air in the second compartment 320, represents the amount of heat recovered, and the amount of heat which has cooled the process air in the evaporator 210 is represented by Q. The cooling effect for cooling the air-conditioned space 101 is represented by i.

A second embodiment of the present invention will be described below with reference to FIGS. 4 and 5. The second embodiment differs from the embodiment shown in FIG. 1 in that restrictions 331, 332 are provided between the evaporating sections in the planes PB, PC and between the evaporating sections in the planes PD, PE in a heat exchanger 300b, respectively. Specifically, in FIG. 4, the end of the evaporating section 251B in the plane PB and the end of the evaporating section 251C in the plane PC are connected to each other via the restriction 331, and the end of the evaporating section 251D in the plane PD and the end of the evaporating section 251E in the plane PE are connected to each other via the restriction 332.

In the above arrangement, the refrigerant introduced into the evaporating section 251B is partly evaporated into a wet state in the evaporating section 251B, is depressurized by the restriction 331, and flows into the evaporating section 251C in the plane PC. The refrigerant is further evaporated in the evaporating section 251C, and then flows into the condensing section 252C. The refrigerant changes its direction in the U tube, and flows into the condensing section 252D. In the condensing section 252D, the refrigerant is further condensed and then flows into the evaporating section 251D. The refrigerant is partly evaporated in the evaporating section 251D, and reaches the restriction 332. The refrigerant is depressurized by the restriction 332, and flows into the evaporating section 251E in the plane PE and subsequently into the condensing section 252E in the plane PE. The refrigerant is sufficiently condensed in the condensing section 252E, and flows through the path 203 to the expansion valve 250. The refrigerant is depressurized by the expansion valve 250, and flows into the evaporator 210.

The evaporating pressures in the evaporating sections 251A, 251B and the condensing pressures in the condensing sections 252A, 252B, i.e., first intermediate pressures, or the pressures in the evaporating sections 251C, 251D and the condensing sections 252C, 252D, i.e., second intermediate pressures, depend on the temperature of the process air before flowing into the evaporator 210 and the temperature of the process air after flowing through the evaporator 210.

Figure 4:
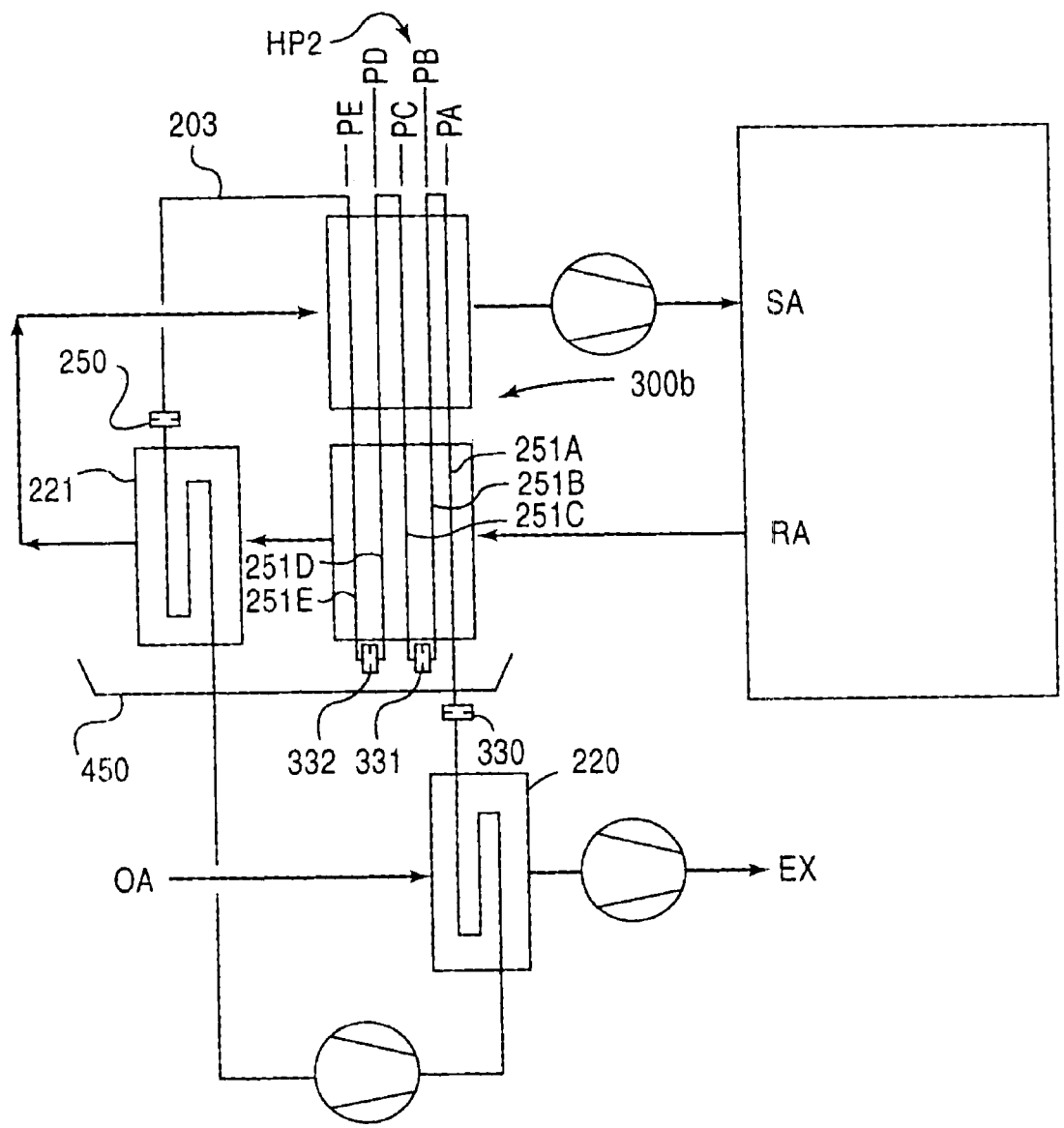
FIG. 4 is a flow diagram of a heat pump according to a second embodiment of the present invention and a dehumidifying air-conditioning apparatus having such a heat pump.
Figure 5:
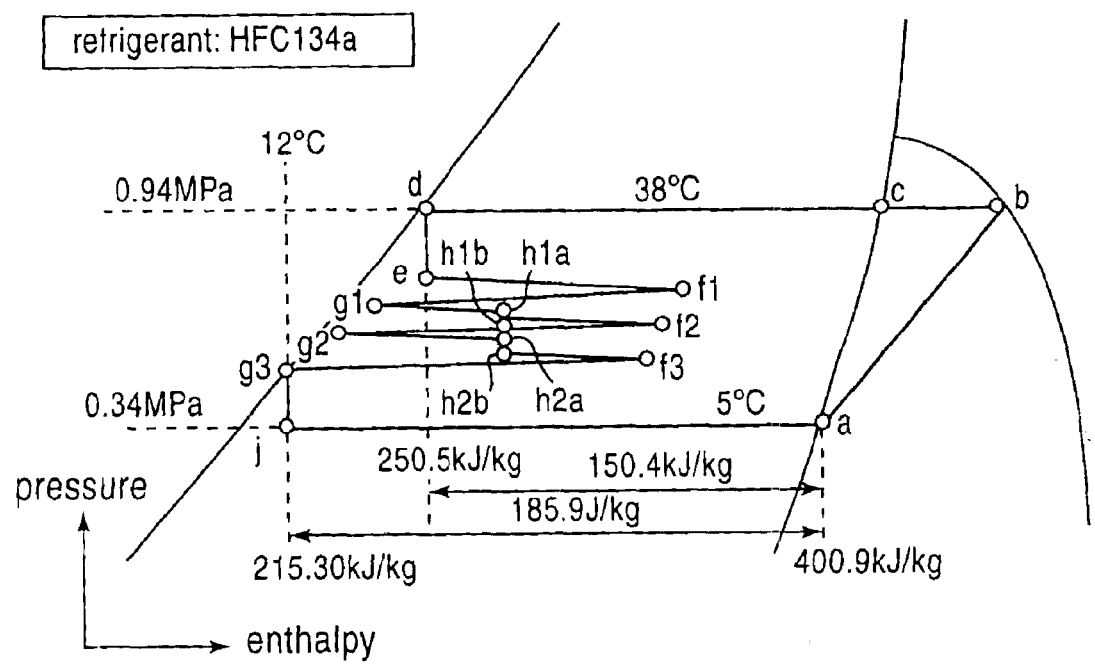
FIG. 5 is a Mollier diagram of the heat pump shown in FIG. 4.

Since the heat exchanger 300 shown in FIG. 1 or the heat exchanger 300b shown in FIG. 4 utilizes heat transfer by way of evaporation and condensation, the heat exchanger has an excellent rate of heat transfer. Particularly, the heat exchanger 300b has a very high efficiency of heat exchange as it performs a heat exchange on the counterflow principles. Since the refrigerant is forcibly caused to flow in a substantially one direction as a whole in the refrigerant passages, from the evaporating section 251 to the condensing section 252 or from the condensing section 252 to the evaporating section 251, the efficiency of heat exchange between the process air having a high temperature and the process air having a low temperature is very high. The expression "the refrigerant flows in a substantially one direction as a whole" means that the refrigerant flows in a substantially one direction in the refrigerant passages when viewed as a whole even though the refrigerant may locally flow back due to turbulences or be vibrated in the flowing direction due to pressure waves produced by bubbles or instantaneous interruptions. In the present embodiment, the refrigerant is forced to flow in one direction under the pressure increased by the compressor 260.

When the high-temperature fluid is cooled, i.e., the heat exchanger is used for cooling the high-temperature fluid, the efficiency φ of heat exchange is defined by $$\phi=(TP1-TP2)/(TP1-TC1)$$

where the temperature of the high-temperature fluid at the inlet of the heat exchanger is represented by TP1, the temperature thereof at the outlet of the heat exchanger by TP2, the temperature of the low-temperature fluid at the inlet of the heat exchanger is represented by TC1, and the temperature thereof at the outlet of the heat exchanger by TC2. When the low-temperature fluid is to be heated, i.e., when the heat exchanger is used to heat the low-temperature fluid, the efficiency φ of heat exchange is defined by $$\phi=(TC2-TC1)/(TP1-TC1)$$

Operation of a heat pump HP2 according to the embodiment shown in FIG. 4 will be described below with reference to FIG. 5. In FIG. 5, the transitions from the point a to the point e are identical to those shown in FIG. 2 and will not be described below.

The refrigerant in the state represented by the point e which flows into an evaporating section 251A1 in the heat exchanger 300b is a mixture of the liquid and the vapor with a part of the liquid being evaporated under the first intermediate pressure, as described above with reference to FIG. 2.

The refrigerant is further evaporated in the evaporating section, and reaches a point f1 nearer to the saturated vapor curve in the wet region on the Mollier diagram. The refrigerant in this state flows into the condensing section, where the refrigerant is condensed. Then, refrigerant is reversed in direction by the U tube and condensed, and reaches a point g1 nearer to the saturated liquid curve though in the wet region. Then, the refrigerant flows into the evaporating section, goes toward the saturated vapor curve within the wet region to reach a point h1a. Up to this point, the refrigerant undergoes changes substantially under the first intermediate pressure.

The refrigerant in the state indicated by the point h1a is depressurized by the restriction 331, and reaches a point h1b under the second intermediate pressure. Specifically, the refrigerant flows from the evaporating sections as the refrigerant passages in the planes PA, PB into the evaporating section as the refrigerant passage in the plane PC. This refrigerant is evaporated under the second intermediate pressure in the evaporating section, and reaches a point f2. The refrigerant is then repeatedly similarly evaporated into vapor phase and condensed into liquid phase alternately, and depressurized by the intermediate restriction 332. Thereafter, the refrigerant flows through the evaporating and condensing sections, and reaches a point g3 on the Mollier diagram which corresponds to the point g2 in FIG. 2. On the Mollier diagram, the point g3 is on the saturated liquid curve. In this point, the refrigerant has a temperature of 12° C. and an enthalpy of 215.0 kJ/kg.

As in the case of FIG. 2, the refrigerant liquid at the point g3 is depressurized to 0.34 MPa, which is a saturated pressure at a temperature of 5° C., by the restriction 250, and reaches a state represented by a point j. The refrigerant flows as a mixture of the refrigerant liquid and the vapor at a temperature of 5° C. into the refrigerant evaporator 210, where the refrigerant removes heat from the process air to be evaporated into a saturated vapor at the state indicated by the point a on the Mollier diagram. The evaporated vapor is drawn again by the compressor 260, and thus the above cycle is repeated.

In the heat exchanger 300b, as described above, the refrigerant repeatedly goes alternately through changes of vapor phase and changes of liquid phase. Since the refrigerant transfers heat by way of evaporation and condensation, the rate of heat transfer is very high and the efficiency of heat exchanger is high, as with the heat exchanger 300.

In the heat exchanger 300b, the process air before being cooled in the evaporator 210 exchanges heat successively in the evaporating sections 251A, 251B, 251C, 251D, 251E in the first compartment 310. Specifically, the temperature gradient of the process air and the temperature gradient of the evaporating sections are in the same direction. Similarly, the process air after being cooled in the evaporator 210 exchanges heat successively in the condensing sections 252E, 252D, 252C, 252B, 252A in the second compartment 320. Specifically, the temperature gradient of the process air and the temperature gradient of the condensing sections are in the same direction. Thus, a heat exchange is performed between the counterflows of the process air before being cooled in the evaporator 210 and the process air after being cooled in the evaporator 210. Such a heat exchange, together with the heat transfer by way of evaporation and condensation, allows the heat exchanger 300b to achieved a very high efficiency of heat exchange.

The enthalpy difference that can be used by the refrigerant evaporator 210 is remarkably larger than that in the conventional heat pump. Thus, the amount of vapor that is circulated to the compressor under the same cooling load and the required power can be reduced by 20% (1−(620.1− 472.2)/(620.1−434.9)=0.20), as in the case of FIG. 2.

Operation of the dehumidifying air-conditioning apparatus with the heat pump HP2 will not be described below as it is qualitatively the same as described above with reference to the psychrometric chart of FIG. 3.

Figure 6:
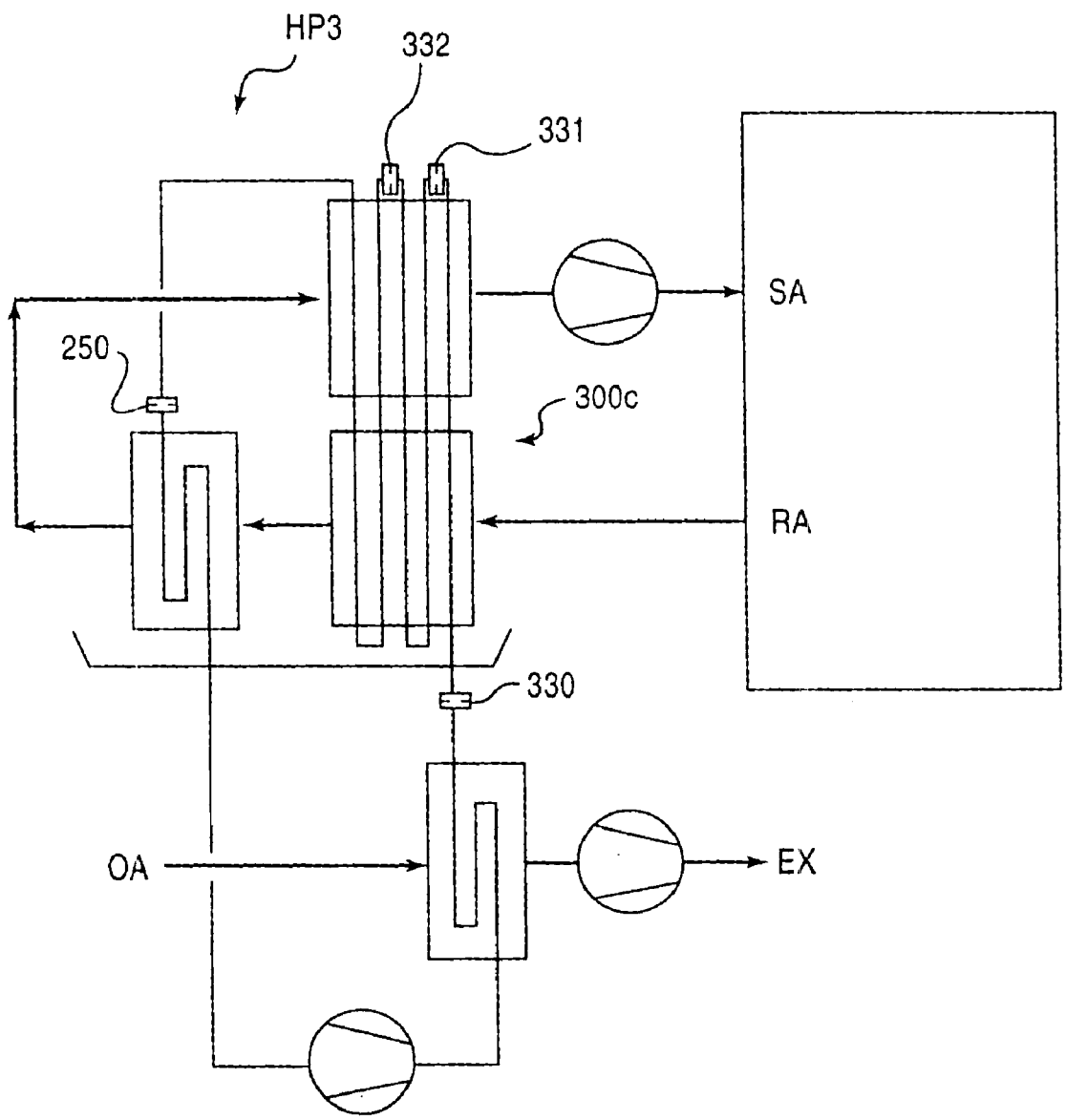
FIG. 6 is a flow diagram of a heat pump according to a third embodiment of the present invention and a dehumidifying air-conditioning apparatus having such a heat pump.

FIG. 6 is a flow diagram of a dehumidifying apparatus according to a third embodiment of the present invention. According to the third embodiment, a heat exchanger 300c, which corresponds to the heat exchanger 300 according to the first embodiment and the heat exchanger 300b according to the second embodiment, has restrictions 331, 332 disposed at the condensing sections side. Other structural details of the third embodiment are identical to those of the second embodiment shown in FIG. 4.

Figure 7:
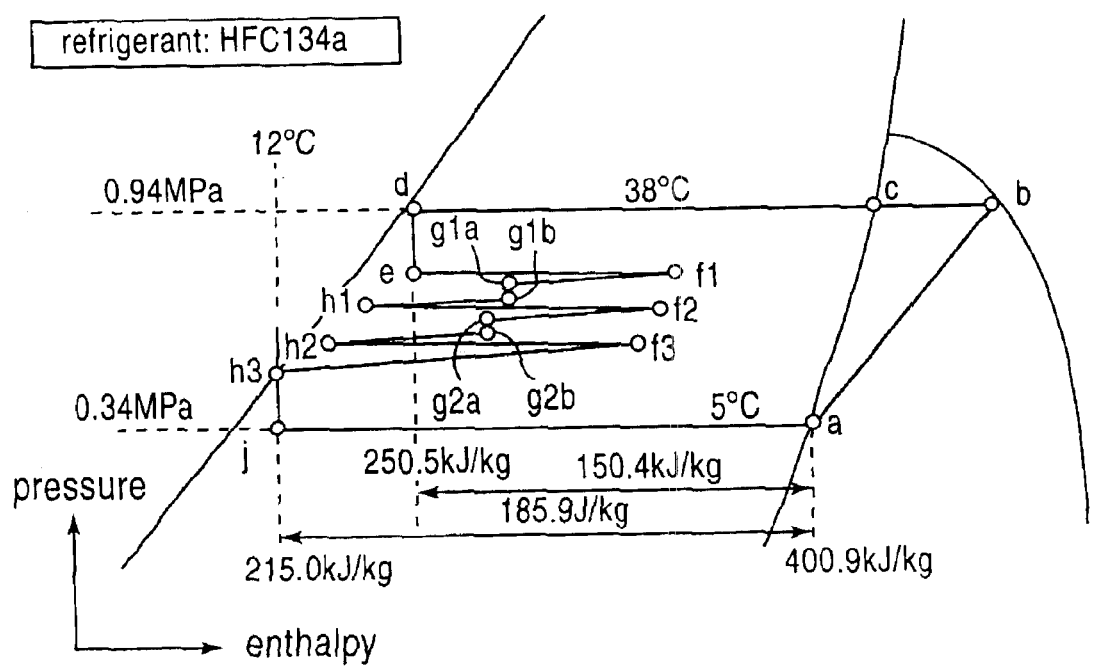
FIG. 7 is a Mollier diagram of the heat pump shown in FIG. 6.

FIG. 7 is a Mollier diagram of a heat pump HP3 shown in FIG. 6. Unlike the Mollier diagram shown in FIG. 5, the refrigerant is depressurized in the condensing process under the intermediate pressure. Specifically, the refrigerant is depressurized from a point g1a to a point g1b by the restriction 331 and depressurized from a point g2a to a point g2b by the restriction 332.

The third embodiment is also the same as the embodiment shown in FIG. 4 in that a heat exchange is performed between the counterflows of the process air before being cooled in the evaporator 210 and the process air after being cooled in the evaporator 210.

Figure 8:
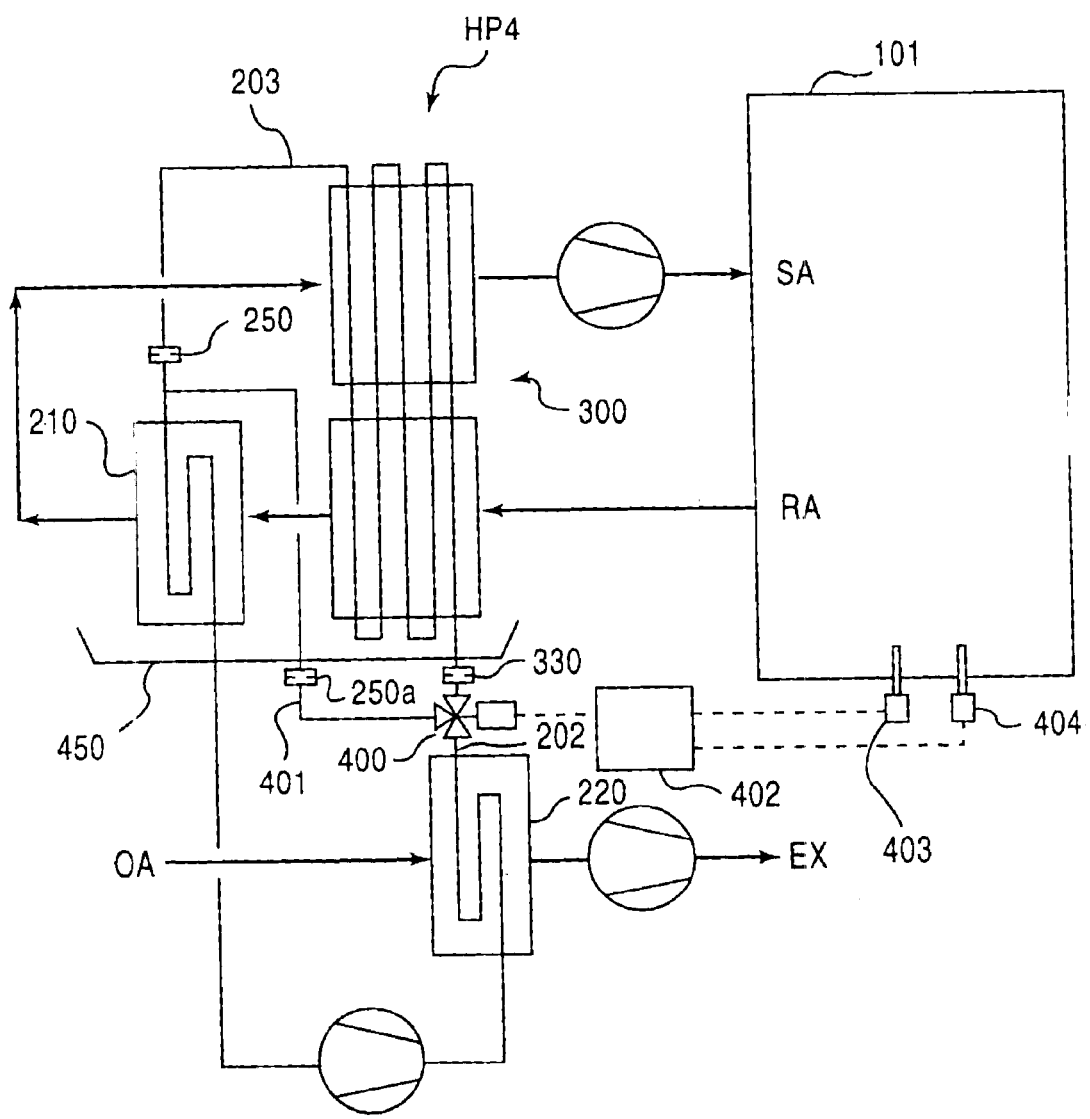
FIG. 8 is a flow diagram of a heat pump according to a fourth embodiment of the present invention and a dehumidifying air-conditioning apparatus having such a heat pump.

A fourth embodiment of the present invention will be described below with reference to FIG. 8. The fourth embodiment differs from the embodiments described above in that there is a bypass path for delivering the refrigerant from the condenser 220 to the evaporator 210. FIG. 8 shows that such a bypass path is provided in the embodiment shown in FIG. 1.

A three-way valve 400 is disposed as directional control means in the refrigerant path 202 between the condenser 220 and the expansion valve 330 shown in FIG. 1. A bypass path 401 extending from the three-way valve 400 is connected to the path extending between the expansion valve 250 and the evaporator 210. Thus, the three-way valve 400 can selectively supplies the refrigerant from the condenser 220 via the expansion valve 330 to the heat exchanger 300 and from the condenser 220 directly to the evaporator 210. An expansion valve 250a is provided on the bypass path between the three-way valve 400 and the evaporator 210. The expansion valve 250a may be dispensed with if the bypass path 401 is joined to the path 203 extending between the heat exchanger 300 and the expansion valve 250.

A controller 402 is connected to the three-way valve 400. The controller 402 receives a signal from a temperature sensor 403 for detecting the temperature of the air-conditioned space 101 and a humidity sensor 404 for detecting the humidity of the air-conditioned space 101, and controls the three-way valve 400 to keep the temperature and humidity in the air-conditioned space 101 at given levels. Specifically, if the sensible heat load of the air-conditioned space 101 is relatively small, the refrigerant is delivered from the condenser 220 to the heat exchanger 300. If the sensible heat load of the air-conditioned space 101 is large, then the refrigerant is delivered from the condenser 220 directly to the evaporator 210 by bypassing the heat exchanger 300 because the dry bulb temperature is increased. If the sensible heat load of the air-conditioned space 101 is of an intermediate value, then the ratio of the time to use the heat exchanger 300 and the time to bypass the heat exchanger 400 may be changed according to the intermediate value.

In FIG. 8, the bypass path 401 is applied to the embodiment shown in FIG. 1. However, the bypass path 401 is also applicable to the embodiment shown in FIG. 4 or the embodiment shown in FIG. 6.

A drain pan 450 is shown in FIGS. 1, 4, 6, and 8, and such a drain pan is preferably located below not only the evaporator 210, but also the heat exchangers 300, 300b, 300c. Particularly, the drain pan 450 is preferably disposed below the first compartment 310 because the process air is mainly precooled in the first compartment 310 and some moisture may possibly be condensed in the first compartment 310.

Figure 9:
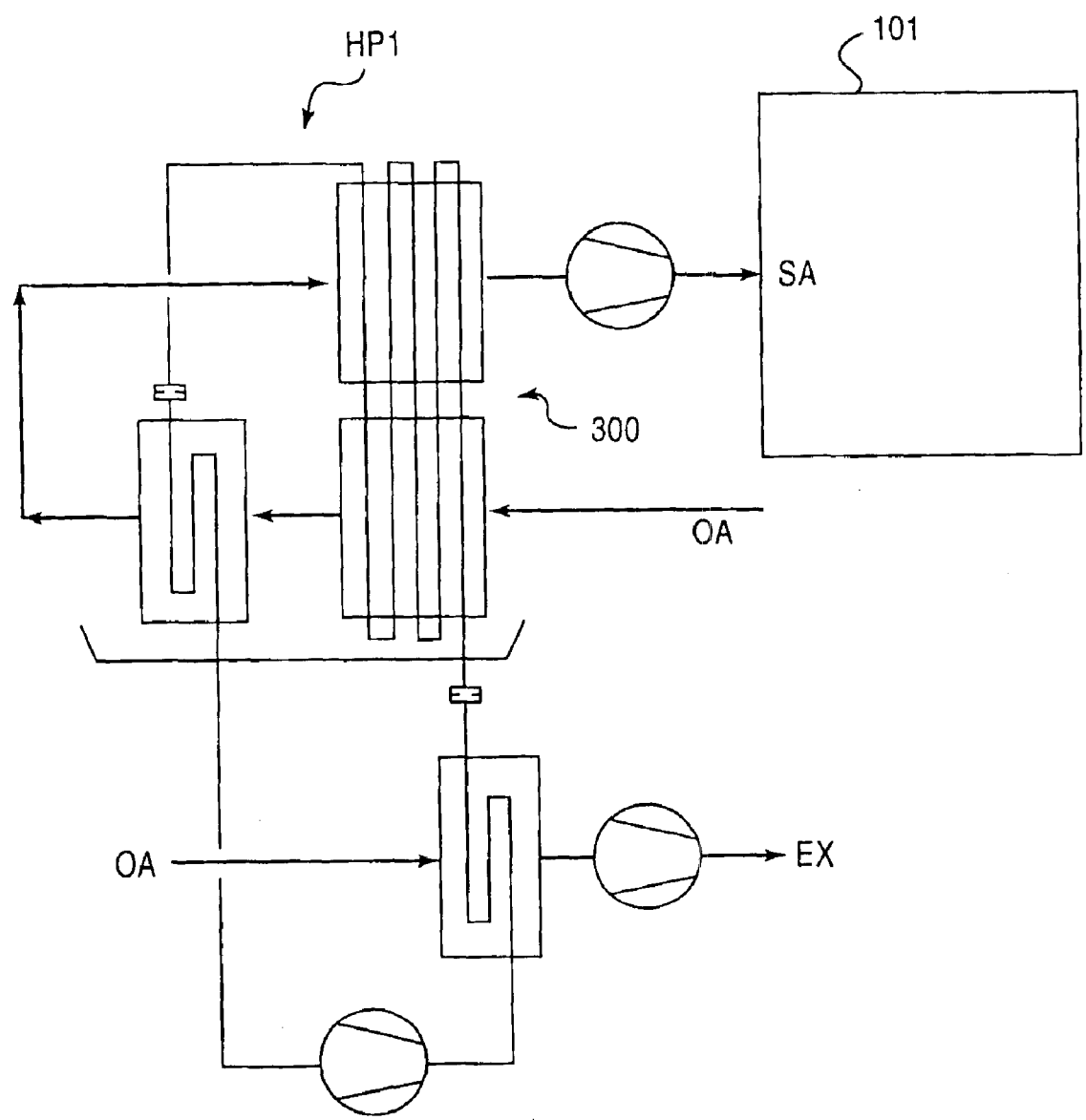
FIG. 9 is a flow diagram of a heat pump according to a fifth embodiment of the present invention and a dehumidifying air-conditioning apparatus having such a heat pump.

In the above embodiments, return air from the air-conditioned space 101 is introduced into the first compartment 310. However, ambient air may be introduced into the first compartment 310 as shown in FIG. 9. Ambient air having a high humidity and a high temperature is preferably precooled before being cooled in the evaporator 210. This arrangement is effective in air-conditioning hospitals and restaurants which require ambient air for a total amount of air-conditioned air, with a high COP.

An example of a structure of the heat exchanger 300 according to the present invention will be described below with reference to FIGS. 10(a) and 10(b).

Figure 10A:
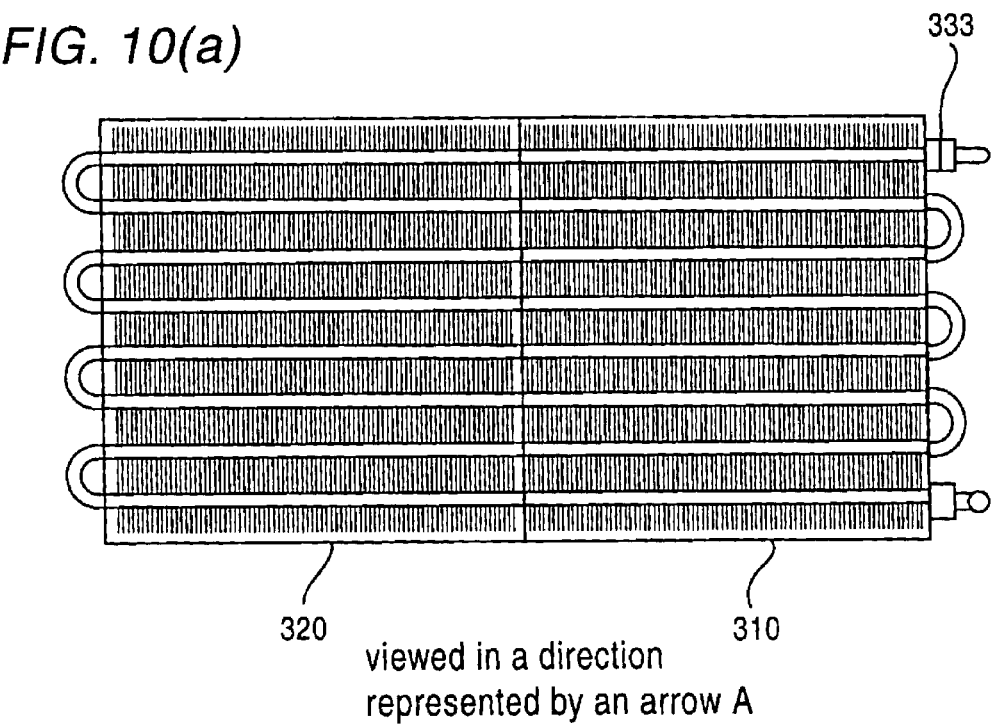
FIGS. 10(a) and 10(b) are schematic plan and side views, respectively, showing a heat exchanger suitable for use in a heat pump according to an embodiment of the present invention.
Figure 10B:
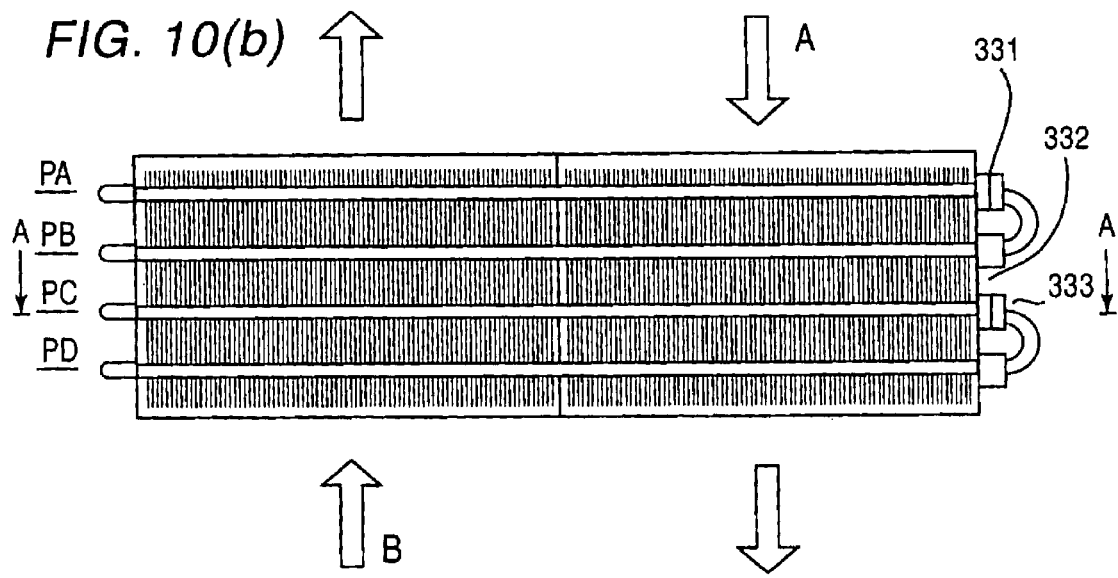
Figure 11:
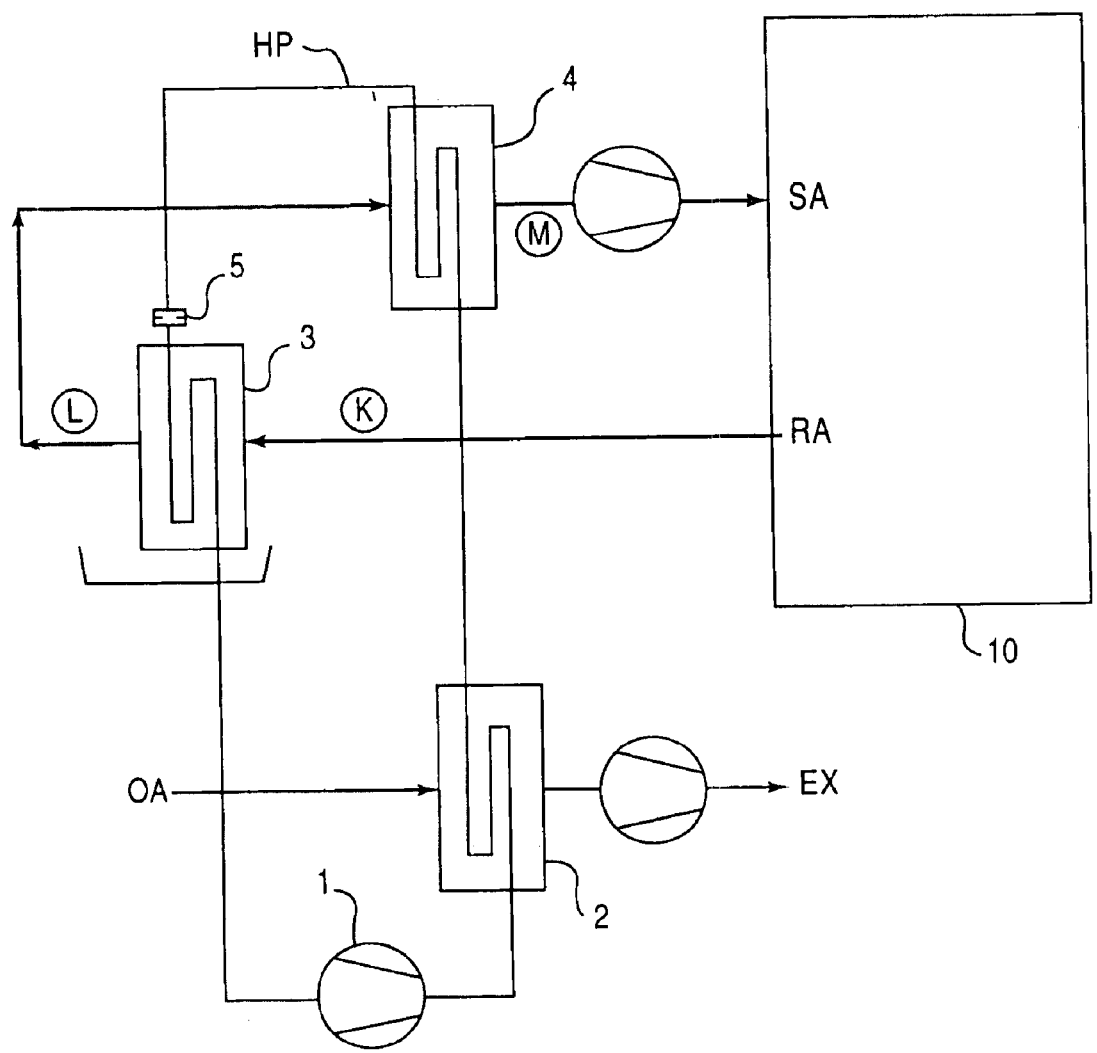
FIG. 11 is a flowchart of a conventional heat pump and a conventional dehumidifying air-conditioning apparatus.
Figure 12:
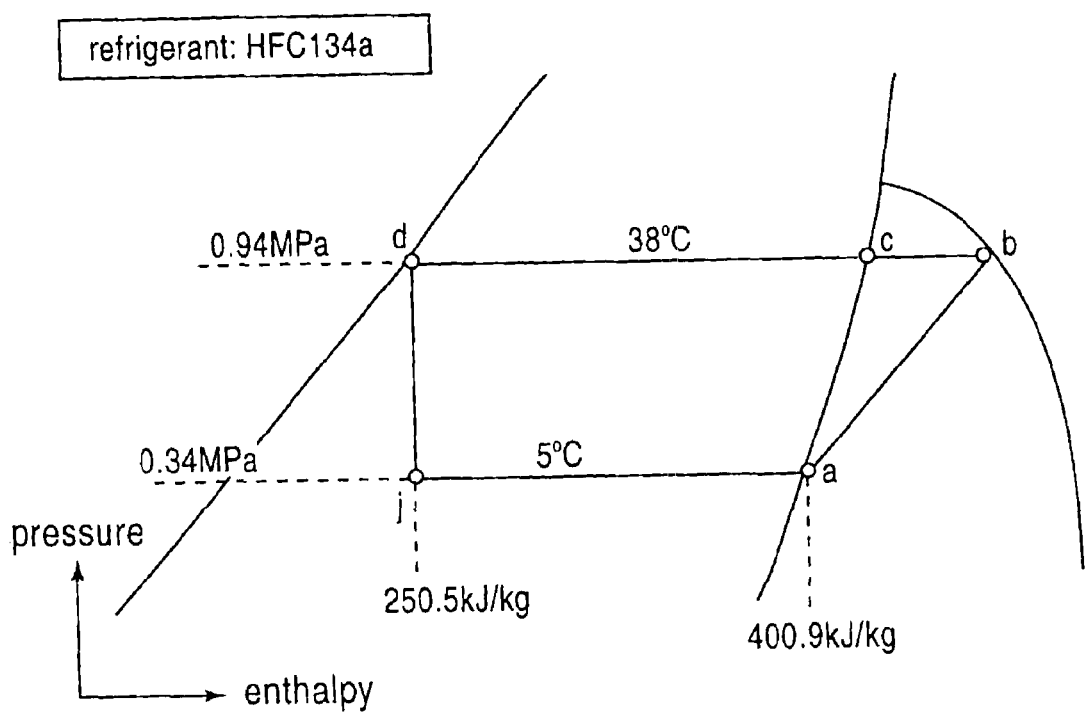
FIG. 12 is a Mollier diagram of the conventional heat pump shown in FIG. 11.
Figure 13:
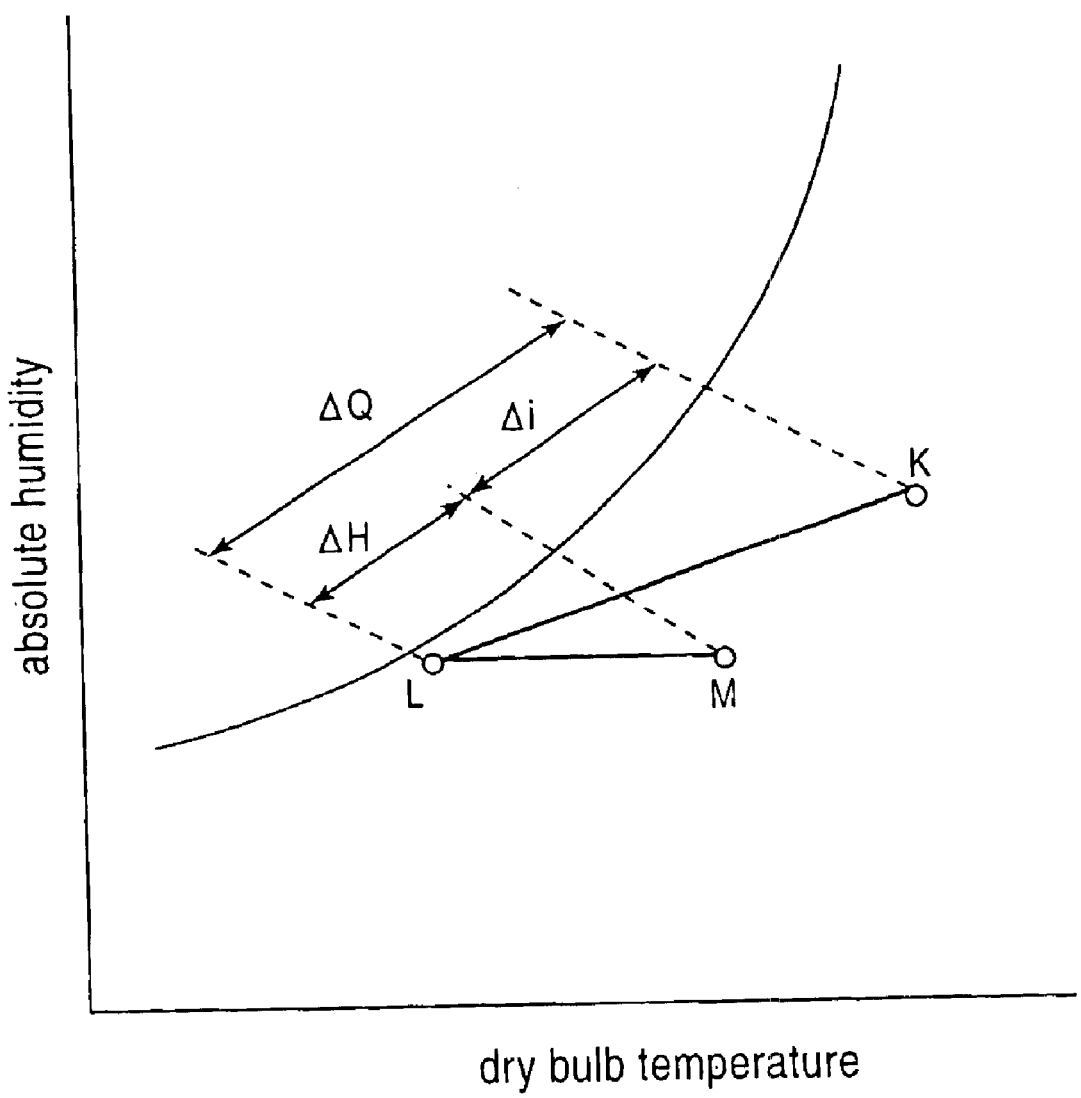
FIG. 13 is a psychrometric chart illustrative of operation of the conventional dehumidifying air-conditioning apparatus shown in FIG. 11.

FIG. 10(a) is a drawing showing the heat exchanger as viewed in the direction in which the process air having a low temperature and the process air having a high temperature are flowing, and FIG. 10(b) is a drawing of side elevational view showing the heat exchanger as viewed in a direction perpendicular to the flows of the low-temperature process air and the high-temperature process air.

In FIG. 10(a), the low-temperature process air flows away from the viewer, and the high-temperature process air toward the viewer. In the heat exchanger, tubes are disposed in eight rows in each of the four planes PA, PB, PC, PD which lie perpendicularly to the flows of the low-temperature process air and the high-temperature process air. Thus, the tubes are arranged in four tiers and eight rows along the flows of the process air. In FIGS. 1, 4, and 6, the heat exchange tube is disposed in one row per tier in each of the planes PA, PB, PC and PD for illustrative purpose. Typically, however, the tubes are provided in a plurality of rows per tier.

An intermediate restriction 331 is disposed in a transition location from the first plane PA to the next plane PB. An intermediate restriction 332 (not shown) is disposed in a transition location from the plane PB to the plane PC. An intermediate restriction 333 is disposed in a transition location from the plane PC to the plane PD. While one restriction is provided in a transition location from one plane to the next, tube rows in the plane PA may be arranged in a plurality of layers. In such an arrangement, an intermediate restriction is disposed in a transition location from each layer to the next. Planes prior and subsequent to an intermediate restriction are referred to as first and second planes.

Heat exchangers each having tubes in eight rows and four layers (tiers) as shown in FIGS. 10(a) and 10(b) may be arranged parallel to each other or in series with each other with respect to the flows of the high- and low-temperature process air, depending on the amount of the process air.

In the Mollier diagram shown in FIG. 7, for example, the cycle is effective even if the refrigerant is repeatedly evaporated and condensed into a subcooled region beyond the saturated liquid curve. In view of the heat exchange between the flows of the process air, however, the refrigerant should preferably change its phase in the wet region. With the heat exchanger shown in FIGS. 10(a) and 10(b), therefore, the heat transfer area of the first evaporating section connected to the restriction 330 should preferably be larger than the heat transfer area of the succeeding evaporating section. Furthermore, since as the refrigerant flowing into the restriction 250 is preferably in the saturated or subcooled region, the heat transfer area of the condensing section connected to the restriction 250 should preferably be larger than the heat transfer area of the prior condensing section.

In the embodiments described above, the same refrigerant is used as a heat transfer medium in the evaporator for cooling the process air to a temperature equal to or lower than its dew point, the precooler for precooling the process air, and the reheater for reheating the process air. Therefore, the refrigerant system is simplified. The refrigerant is positively circulated because the pressure difference between the evaporator and the condenser can be utilized. Since a boiling phenomenon with a phase change is applied to heat exchanges for precooling and reheating the process air, a high efficiency can be achieved.

The dehumidifying apparatus according to the above embodiments has been described as the dehumidifying air-conditioning apparatus for air-conditioning a space. However, the dehumidifying apparatus according to the present invention is applicable not only to the air-conditioned space, but also to other spaces that need to be dehumidified.

INDUSTRIAL APPLICABILITY

As described above, according to the present invention, there is provided a heat pump comprising heat exchanging means for evaporating and condensing a refrigerant under an intermediate pressure between a condensing pressure of a condenser and an evaporating pressure of an evaporator to cool the low-temperature heat source fluid by evaporation of the refrigerant under the intermediate pressure and to heat the low-temperature heat source fluid by condensation of the refrigerant under the intermediate pressure. Therefore, the low-temperature heat source fluid is successively cooled by the heat exchanging means, cooled by the evaporator, and heated by the heat exchanging means in the order named. Hence, the low-temperature heat source fluid can be pre-cooled by the heat exchanging means prior to cooling in the evaporator, and the amount of heat removed in the precooling process can be recovered from the low-temperature heat source fluid which has been cooled by the evaporator. Therefore, a heat pump with a high coefficient of performance can be provided.

When process air is used as the low-temperature heat source and is cooled to a temperature equal to or lower than its dew point by the evaporator, it is possible to provide a dehumidifying apparatus which consumes a small amount of energy per amount of moisture removal.

What is claimed is:

1. An apparatus comprising:
    a compressor for compressing a refrigerant;
    a condenser for condensing said refrigerant to transfer heat from said refrigerant to a first heat source fluid;
    an evaporator for evaporating said refrigerant to transfer heat to said refrigerant from a second heat source fluid in a heat source fluid path; and
    a heat exchanger having at least one refrigerant path including an evaporating section and a condensing section, said heat exchanger configured to accommodate a portion of said heat source fluid path in order to transfer heat from said second heat source fluid to said refrigerant in said evaporating section and to transfer heat to said second heat source fluid from said refrigerant in said condensing section.

2. The apparatus of claim 1, wherein said at least one refrigerant path includes multiple refrigerant paths.

3. The apparatus of claim 2, further comprising:
    at least one restriction in said heat exchanger, said at least one restriction located in a refrigerant passageway positioned between evaporating sections of two adjacent refrigerant paths.

4. The apparatus of claim 2, further comprising:
    at least one restriction in said heat exchanger, said at least one restriction located in a refrigerant passageway positioned between condensing sections of two adjacent refrigerant paths.

5. The apparatus of any one of claims 1–4, further comprising:
    a three-way valve.

6. The apparatus of claim 5, further comprising:
    a controller;
    a temperature sensor; and
    a humidity sensor,
    wherein said controller is operative to control the three-way valve based on signals from said temperature sensor and said humidity sensor.

7. The apparatus of one of claims 1 and 2, wherein said heat source fluid path has an entrance and an exit, and said second heat source fluid, after exiting from said heat source fluid path, is restricted from flowing from said exit to said entrance.

8. A method of using a refrigerant flowing through a closed path, said method comprising the following steps in order:
    A. increasing the pressure of the refrigerant from a low pressure to a high pressure;
    B. condensing at least a portion of the refrigerant;
    C. decreasing the pressure of the refrigerant to a first intermediate pressure that is between said low pressure and said high pressure;
    D. evaporating at least a portion of the refrigerant;
    E. condensing at least a portion of the refrigerant;
    F. decreasing the pressure of the refrigerant to said low pressure; and
    G. evaporating the refrigerant.

9. The method of claim 8, wherein:
    step B is effected by transferring heat from the refrigerant to a first fluid;
    step D is effected by transferring heat from a second fluid to said refrigerant;
    step E is effected by transferring heat from said refrigerant to said second fluid; and
    step G is effected by transferring heat from said second fluid to said refrigerant.

10. The method of one of claims 8 and 9, further comprising after step E:
    decreasing the pressure of the refrigerant to a second intermediate pressure that is between said first intermediate pressure and said low pressure.

11. The method of claim 10, wherein said condensing of step B condenses all of said refrigerant, and said evaporating of step G evaporates all of said refrigerant.

12. The method of one of claims 8 and 9, wherein said first fluid is hotter than said second fluid.

13. A method of controlling a three-way valve to direct a refrigerant through an apparatus that has:
    a compressor for compressing said refrigerant;
    a condenser for condensing said refrigerant to transfer heat from said refrigerant to a first heat source fluid;
    an evaporator for evaporating said refrigerant to transfer heat to said refrigerant from a second heat source fluid in a heat source fluid path;
    a heat exchanger having at least one refrigerant path including an evaporating section and a condensing section, said heat exchanger configured to accommodate a portion of said heat source fluid path in order to transfer heat from said second heat source fluid to said refrigerant in said evaporating section and to transfer heat to said second heat source fluid from said refrigerant in said condensing section;
    a first refrigerant circuit arranged to direct fluid in order to said compressor, said condenser, said heat exchanger, and said evaporator;
    a second refrigerant circuit arranged to bypass said heat exchanger to direct fluid in order to said compressor, said condenser, and said evaporator;
    said three-way valve to direct refrigerant through either said first refrigerant circuit or said second refrigerant circuit;
    a temperature sensor to detect the temperature of an air-conditioned space; and
    a humidity sensor to detect the humidity of an air-conditioned space,
    said method comprising:
    A. receiving, from said temperature sensor, signals indicating the temperature of said air-conditioned space;
    B. receiving, from said humidity sensor, signals indicating the humidity of said air-conditioned space; and
    C. controlling said three-way valve to direct refrigerant through either said first refrigerant circuit or said second refrigerant circuit based on said signals received from said temperature sensor and said humidity sensor.

14. The apparatus of claim 13, wherein said at least one refrigerant path includes multiple refrigerant paths.

* * * * *